(12) United States Patent
Rawson

(10) Patent No.: US 11,891,796 B2
(45) Date of Patent: Feb. 6, 2024

(54) AERO-ACOUSTIC MATERIALS PROCESSING PLANT WITH NOISE ATTENUATION SYSTEM

(71) Applicant: Colin Rawson, Caulfield North (AU)

(72) Inventor: Colin Rawson, Caulfield North (AU)

(73) Assignee: DAVIES COLLISION CAVE PTY LTD, Melbourne (AU)

( * ) Notice: Subject to any disclaimer, the term of this patent is extended or adjusted under 35 U.S.C. 154(b) by 971 days.

(21) Appl. No.: 17/046,908

(22) PCT Filed: Apr. 13, 2018

(86) PCT No.: PCT/AU2018/050337
§ 371 (c)(1),
(2) Date: Oct. 12, 2020

(87) PCT Pub. No.: WO2018/187848
PCT Pub. Date: Oct. 18, 2018

(65) Prior Publication Data
US 2021/0164221 A1 Jun. 3, 2021

(30) Foreign Application Priority Data
Apr. 13, 2017 (AU) .............................. 2017901372

(51) Int. Cl.
| E04B 1/82 | (2006.01) |
| B02C 19/06 | (2006.01) |
| E04B 1/86 | (2006.01) |
| F16B 5/02 | (2006.01) |
| G10K 11/162 | (2006.01) |

(52) U.S. Cl.
CPC ............ *E04B 1/8218* (2013.01); *B02C 19/06* (2013.01); *E04B 1/86* (2013.01); *F16B 5/02* (2013.01); *G10K 11/162* (2013.01)

(58) Field of Classification Search
CPC ......... E04B 1/8218; E04B 1/86; B02C 19/06; F16B 5/02; G10K 11/162
See application file for complete search history.

(56) References Cited

U.S. PATENT DOCUMENTS 4,120,376 A * 10/1978 Palmer ................. E04B 1/8218
181/204
5,337,620 A   8/1994 Kalidini
(Continued)

FOREIGN PATENT DOCUMENTS

CN   101713335 A   5/2010
CN   202410762 U   9/2012
(Continued)

OTHER PUBLICATIONS

International Search Report and Written Opinion for International Patent Application No. PCT/AU2018/050337, 8 pages.
(Continued)

*Primary Examiner* — Forrest M Phillips
(74) *Attorney, Agent, or Firm* — Morgan, Lewis & Bockius LLP

(57) ABSTRACT

A housing for an aero-acoustic processing machine having rotational drive apparatus coupled to rotate an air impeller to draw air and material to be processed through an axial inlet system and expel the air and processed material through a transverse outlet. The housing includes an enclosure incorporating at least one layer of noise attenuation materials surrounding the aero-acoustic processing machine, the enclosure having a material inlet port, an air inlet port and an exhaust port for outputting processed product with air. Airflow paths that are required for operation of the aero-acoustic processing machine are provided to enable airflow into the housing whilst significantly reducing noise emission.

18 Claims, 9 Drawing Sheets

(56) References Cited

U.S. PATENT DOCUMENTS

| | | | |
|---|---|---|---|
| 5,440,941 A | | 8/1995 | Kalidind |
| 11,324,845 B1 * | | 5/2022 | Ricciardi ................. A61L 2/06 |
| 2003/0072648 A1 | | 4/2003 | Han et al. |
| 2004/0200910 A1 | | 10/2004 | Graham et al. |
| 2005/0188712 A1 * | | 9/2005 | MacDonald ............ F01P 11/12 |
| | | | 62/259.1 |
| 2007/0278035 A1 * | | 12/2007 | Mitchell ................ F01D 25/30 |
| | | | 181/290 |
| 2011/0000322 A1 | | 1/2011 | Chen et al. |
| 2011/0049198 A1 | | 3/2011 | Muth |
| 2016/0149433 A1 * | | 5/2016 | Hopper .................. H02J 50/10 |
| | | | 320/108 |
| 2017/0284084 A1 * | | 10/2017 | Carapinha ............ E04B 1/8409 |
| 2019/0186765 A1 * | | 6/2019 | Haveri ................... F24F 7/013 |

FOREIGN PATENT DOCUMENTS

| | | | | |
|---|---|---|---|---|
| CN | 103127987 A | | 6/2013 | |
| CN | 104359703 A | | 2/2015 | |
| CN | 106639012 A | | 5/2017 | |
| GB | 2083096 A | * | 3/1982 | .......... E04B 1/8218 |
| WO | 2017129696 A1 | | 8/2017 | |

OTHER PUBLICATIONS

International Search Report and Written Opinion for International Patent Application No. PCT/AU2019/050332, 11 pages.

\* cited by examiner

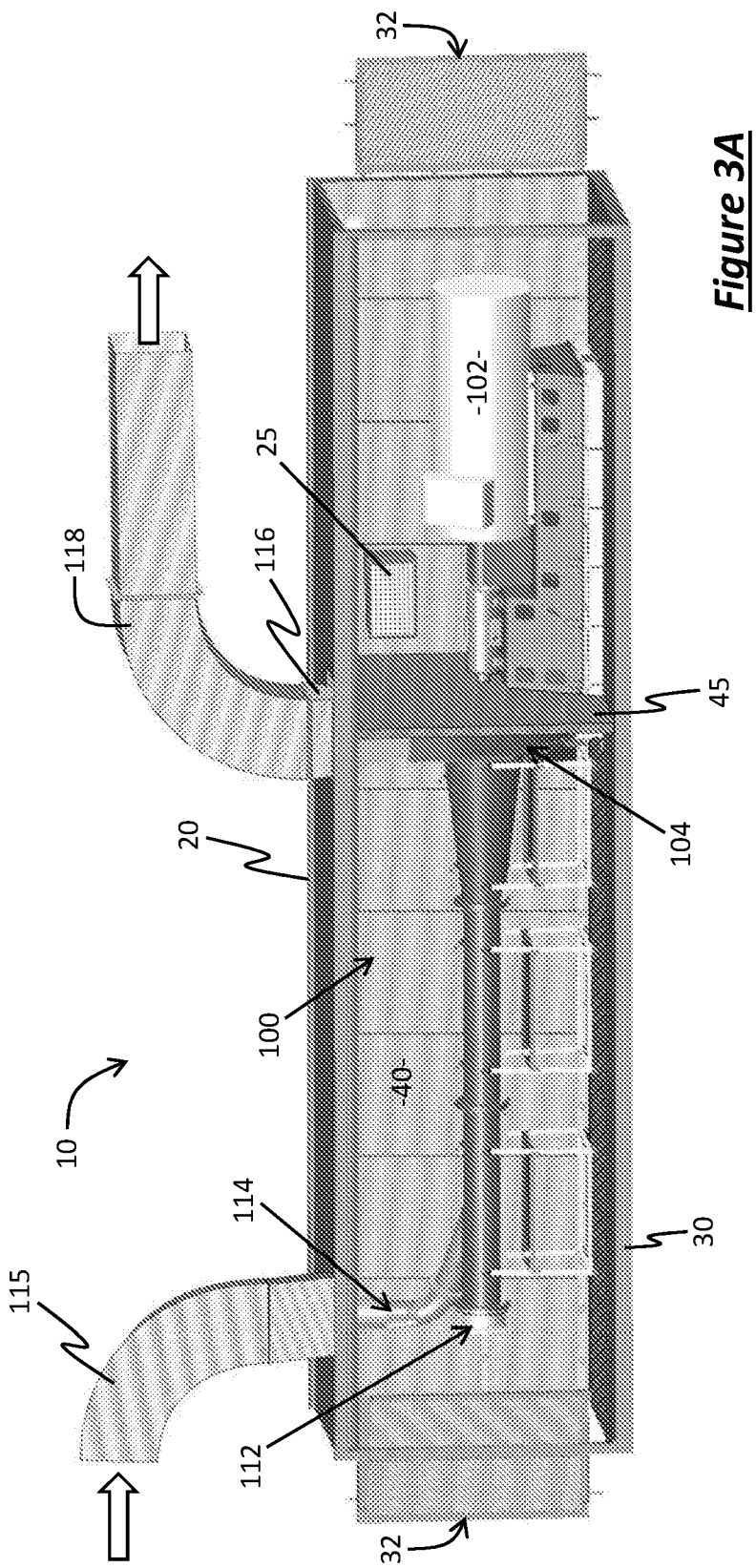

AERO-ACOUSTIC MATERIALS PROCESSING PLANT WITH NOISE ATTENUATION SYSTEM

CROSS REFERENCE TO RELATED APPLICATIONS

This application is a U.S. National Phase of International Application No. PCT/AU2018/050337 filed on Apr. 13, 2018, entitled "Aero-Acoustic Materials Processing Plant with Noise Attenuation System", which is incorporated by reference herein in its entirety.

FIELD OF THE INVENTION

The present invention relates to an aero-acoustic materials processing plant, and in particular to a system for noise attenuation thereof.

BACKGROUND

A form of aero-acoustic grinding machine has been developed, referred to herein as a "vortex machine" for convenience. The vortex machine is an extreme aero-acoustic device that may be used to mill, grind, blend and dry a wide range of materials. The nature of the machine is such that it produces significant noise that can be in excess of 120 dB.

To enable its use of such a machine in general commercial applications, the noise should be reduced to below 85 dB, an accepted international standard. To achieve a noise level that meets the legal requirements of a workplace at which the vortex machine may find application, specific noise attenuation is required. For example, in Australia the national standard for exposure to noise in the occupational environment is an eight-hour equivalent continuous A-weighted sound pressure level, LAeq, 8 h, of 85 dB(A).

It would therefore be desirable to provide a system for noise attenuation suitable for a vortex machine to permit operation of the machine in general occupational environments.

SUMMARY OF THE INVENTION

In accordance with the invention there is provided an aero-acoustic materials processing plant including an aero-acoustic processing machine having rotational drive apparatus coupled to rotate an air impeller to draw air and material to be processed through an axial inlet system and expel the air and processed material through a transverse outlet, the plant further comprising a housing enclosure surrounding the aero-acoustic processing machine, the housing enclosure constructed to include noise attenuation panels.

In accordance with the present invention there is also provided a housing for an aero-acoustic processing machine having rotational drive apparatus coupled to rotate an air impeller to draw air and material to be processed through an axial inlet system and expel the air and processed material through a transverse outlet, the housing including an enclosure incorporating at least one layer of noise attenuation materials surrounding the aero-acoustic processing machine, the enclosure having a material inlet port, an air inlet port and an exhaust port for outputting processed product with air.

The material inlet port and exhaust port may have respective ducts for conveying raw material and processed product, respectively, into and out of the housing. Preferably the ducts are provided with at least one layer of noise attenuation material. The air inlet port may be in communication with an air inflow vent arrangement comprising one or more indirect inlet ducts that allow for air to be drawn into the enclosure via an elongate path between an outer wall of the housing and at least one of said layers of noise attenuation materials. The air inflow vent arrangement may further include a plurality of baffles arranged within the or each inlet duct for reducing sound emission from the housing through the air inlet port.

In one embodiment the housing includes a baffle wall incorporating or composed of noise attenuation materials, the baffle wall partitioning the housing interior into first and second compartments respectively containing the rotational drive apparatus and the impeller, wherein a drive shaft is arranged to extend through the baffle wall from the rotational drive apparatus to the impeller. The material inlet port, air inlet port and exhaust port are located in the second compartment. Preferably the first compartment is provided with an air-conditioning unit for forced induction of cooled air into the first compartment from outside the housing, creating a relative positive pressure as between the first and second compartments.

BRIEF DESCRIPTION OF THE DRAWINGS

In order that the invention may be more easily understood, the following detailed description is provided including description of several embodiments, presented by way of example only, and with reference to the accompanying drawings in which:

FIGS. 3A and 3B are partial-section perspective views of a vortex machine in a transportable noise-attenuating enclosure, according to an embodiment of the invention;

DETAILED DESCRIPTION

It has been found that a cyclone created in a stream of air passing through a conduit, preferably of circular cross-section, the centripetal forces created by the motion of the air stream pull any particulate material entrained in the air stream away from the walls of the conduit and towards its central region. If a wide range of sonic frequencies are created within the conduit, a pattern of powerful vortices are created in the air stream. Without being bound by theory, it is thought that energies are released by conversion of the potential energy to kinetic energy due to the stresses created within the cyclone which causes a minute explosion. The vortices of the cyclone take the form of implosions which are capable of breaking the material up further into smaller particles.

It has also been found that the vortices created in the cyclonic air stream carry further harmonic frequencies generated by the specially designed apparatus, and this sets up a pulse from the standing wave configuration within the system, and causes pockets of air within the standing wave to achieve a velocity beyond the sonic range. This can be tuned for a particular type of material which enhances the ability of the vortices created to break up very hard and soft materials such as stone and to dry materials.

The apparatus and fan produce a harmonic/frequency which sets up pulses from the standing configuration within the system, and on occasion pockets of air through the standing wave achieve a velocity beyond the sonic range. These conditions, i.e. high local vorticity and high energy dissipation, when optimised, will produce vortices through which material may be comminuted and/or dried before reaching the impeller, by a combination of thermal shock, cavitation, and sudden extremes of pressure and frequency/harmonic interference which is sometimes beyond the sonic range.

Operation of such a vortex machine is accompanied by high noise levels, beyond recognised safe standards for workplace environments. In order for commercial application such a vortex machine should be safe to use in the many locations where the materials to be processed are found. Noise attenuation to international standards to meet local site specific requirements is therefore necessary, the principal reasons being:

1. Reducing the noise from the machine will make the machine safe to use.
2. Soundproofing will make the machine marketable to a broad range in industries applications and locations where excessive noise levels are prohibitive or prohibited.
3. The vortex machine noise is in most cases, of a low frequency making it particularly dangerous.
4. The vortex should be enclosed by walls with access via doors that can be closed.

Figure 1:
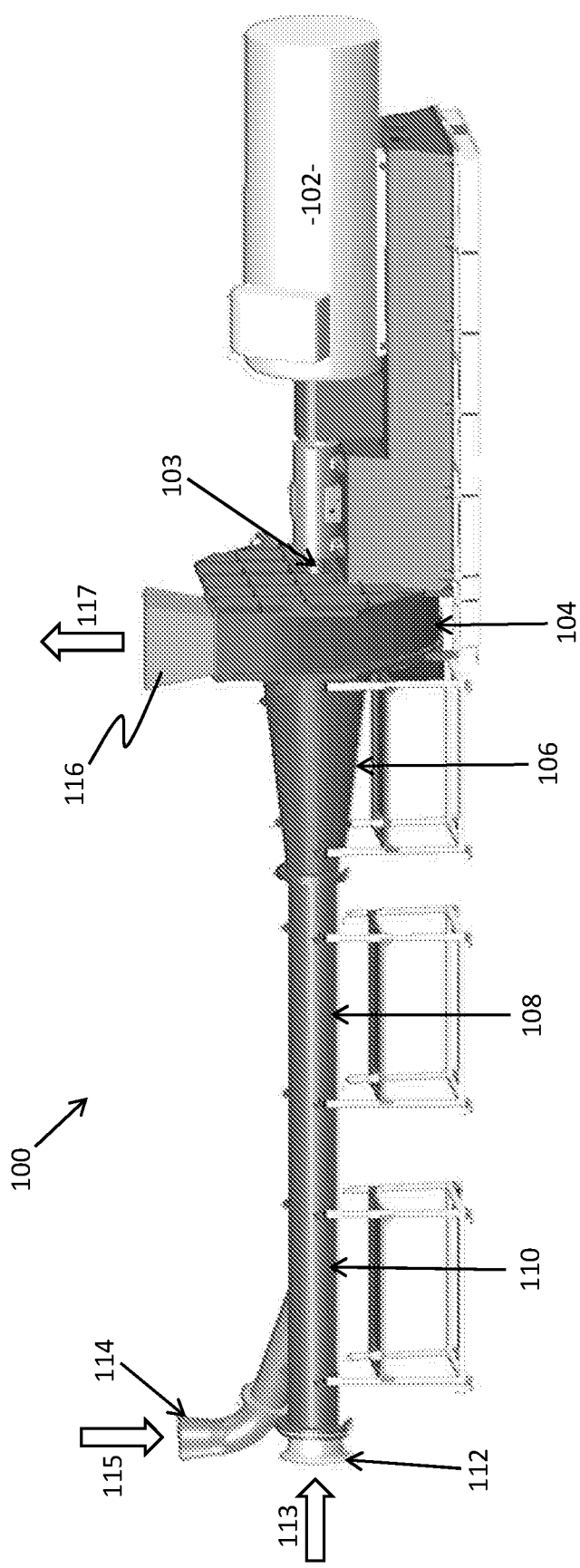
FIG. 1 is a partial-section side view of a vortex machine in a transportable noise-attenuating enclosure, according to an embodiment of the invention.

FIG. 1 illustrates a vortex machine 100 having a motor 102 that is coupled to rotationally drive an impeller 104 by way of drive shaft 103. An axial inlet to the impeller 104 includes a frustoconical inlet pipe 106 and first and second pipe sections 110, 108. The first pipe section 110 has an air inlet opening 112 and is coupled with a material feed tube 114. In use, air (indicated by arrow 113) is drawn in through the air inlet opening 112 and material to be processed (indicated by arrow 115) enters the machine through the feed tube 114. The material is comminuted and/or dried before reaching the impeller 104 and thus is able to pass through the impeller and be transversely expelled through an outlet port 116 as indicated by arrow 117.

Figure 2:
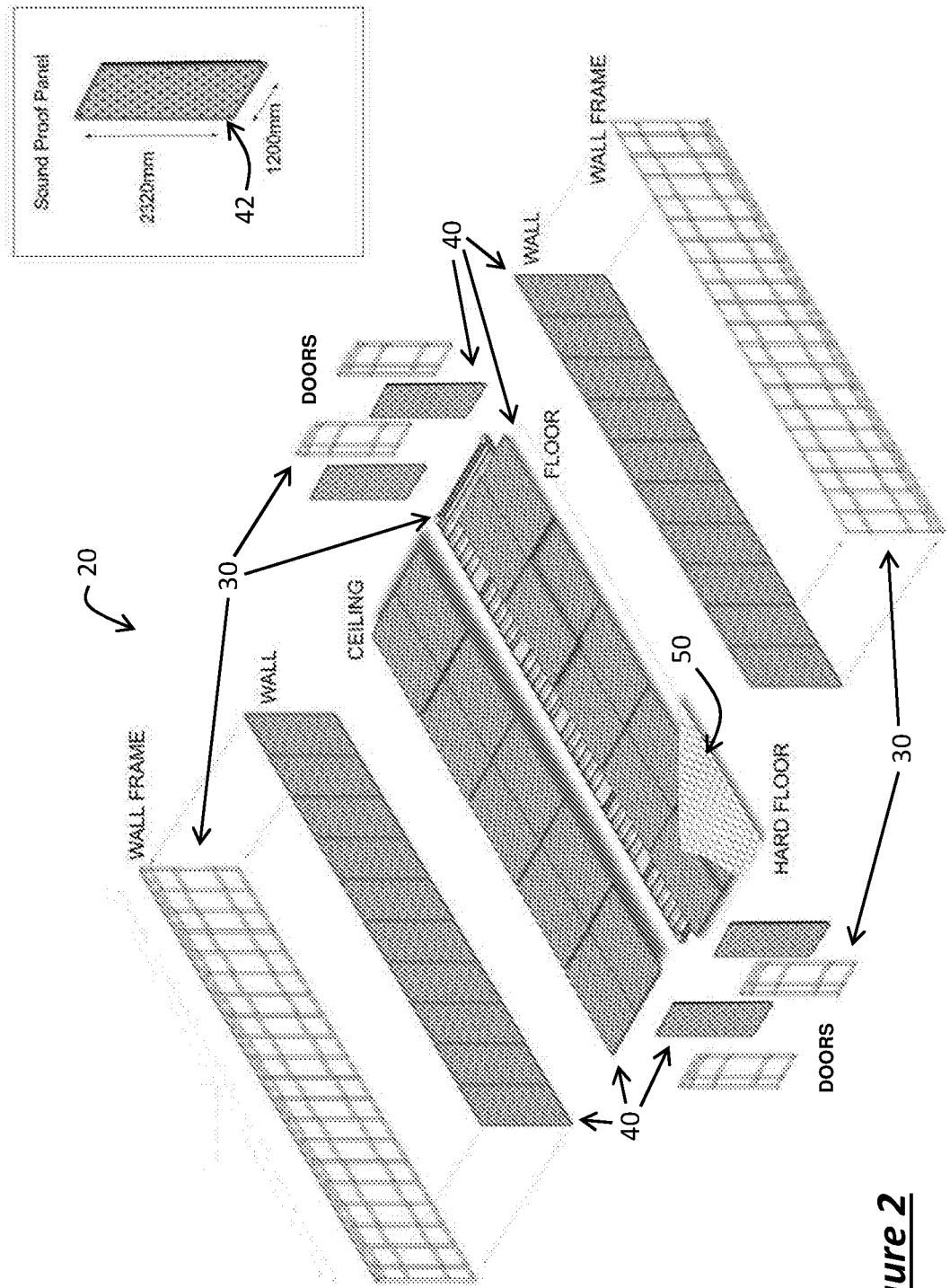
FIG. 2 is an exploded perspective view of an enclosure structure.

FIG. 2 is a perspective exploded view illustrating the primary components forming a noise attenuating enclosure 20 that is a key element in a noise attenuation strategy for construction of an operational aero-acoustic materials processing plant. The enclosure 20 is constructed from two layers 30, 40 that form an elongate box structure for housing the vortex machine. The external layer 30 comprises a predominantly metal structure including elongate floor, wall and roof (roof not shown) and hinged access doors at the ends. Within the external layer 30 is provided an internal noise attenuation layer 40 which comprises a plurality of sound absorbing panels 42 that abut or overlap one another to cover each of the internal surfaces of the outer, structural layer 30. In order to provide support for the vortex machine apparatus, a hard floor surface 50 may be installed over the noise attenuation layer on the bottom of the enclosure.

It has been found that a vortex machine of suitable size and materials processing capacity may be constructed to be housed within an enclosure 20 including structure comprised of a 40 ft standard shipping container Specifically, a shipping container may be employed to provide the external, structural layer 30 of the enclosure. This arrangement has the added benefit of allowing the processing plant to be readily transportable using existing transport infrastructure. However, a shipping container of itself does not provide adequate noise attenuation, and thus every opportunity to increase the soundproof characteristics of the vortex housing should be pursued, considering the:

a) Container walls;
b) Container doors;
c) Container floor;
d) Air inlet vents;
e) Material input duct;
f) Material output and exhaust duct; and
g) Differences between enclosure conditions that may be required as between the materials processing apparatus and the driving machinery.

The walls of the container present the largest exposed area where noise can penetrate to the outside. In previous tests a transport container of standard construction, has been lined with dense acoustic matting and heavy metallic layer. This material used on the internal wall of the container reduced the exterior sound from the machine from 128 db to 87 db. Further attention to fully lining the exterior ducts, and use of air inlet baffles to increase soundproof characteristics or a combination of a range of similar materials to their best advantage may achieve the maximum possible reduction in the noise, as discussed further below.

Opportunities for Noise Reduction

Suitable sound absorption strategies must treat the combined phenomena of vibrations, sound transmission and sound reverberation whilst still providing for required airflow.

There are several opportunities to increase the sound absorption characteristics of the Vortex.

1. Target the source of the noise
    a) Feed Pipe inlet
    b) Processing pipe
    c) Fan Housing
    d) Exhaust outlet pipe
2. Develop an acoustic enclosure of the vortex machine as an entire unit
3. Develop an acoustic enclosure for a group of vortex machines Design Response Based on the identified design criteria a specifically constructed vortex acoustic enclosure has been developed to achieve the noise reduction objectives specified.

The details that make it work most efficiently are;
Materials used
Enclosure Construction
Air Flow Vortex Acoustic Enclosure FIG. 3A illustrates an aero-acoustic material processing plant 10 including a vortex machine 100 housed in a noise attenuating enclosure 20. The nearside wall of the enclosure 20 is removed in this diagram for the purposes of illustration of the structure and interior arrangement. As previously described, the enclosure 20 has an exterior structure 30 fabricated from steel, which may comprise a modified shipping container, for example. The enclosure has a door 32 at each end that provide access to the interior for maintenance, but during normal operation of the materials processing plant the doors 32 would ordinarily be closed.

The vortex machine 100 in mounted within the enclosure 20 with the motor 102 toward one end and the air inlet opening 112 toward the other end. All of the interior surfaces of the structure 30 are covered with noise attenuation layer 40, comprising sound absorbing panels 42 mounted to the structure 30 in a manner described hereinbelow. A baffle wall 45 may also be included between the motor 102 and the impeller 104 to partition the materials processing apparatus from the driving machinery, as described further below.

Figure 3C:
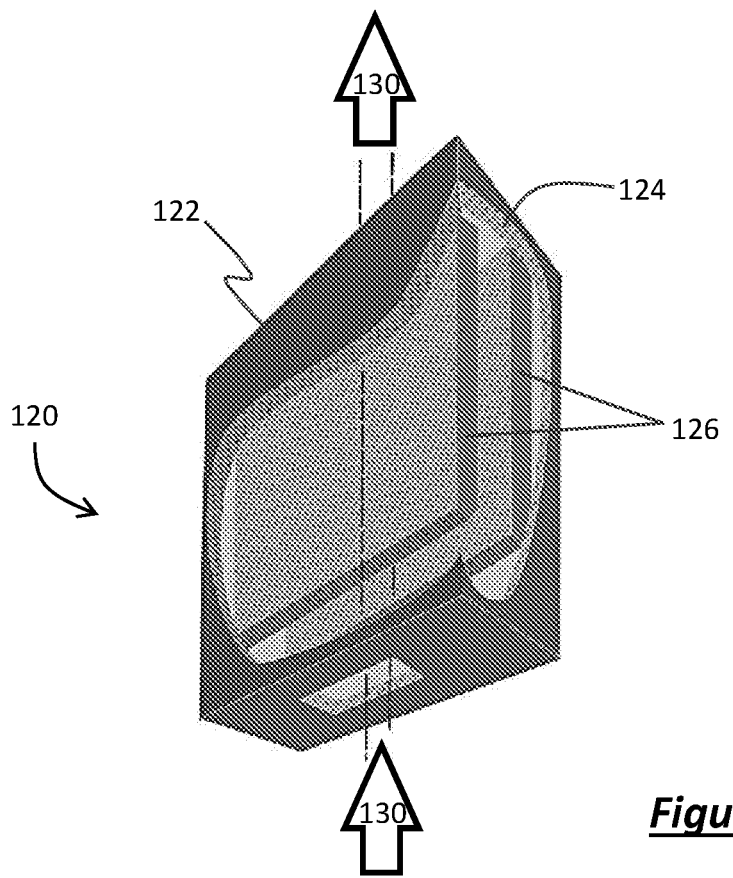
FIG. 3C is a partial-section perspective view of an output duct noise reduction structure seen in FIG. 3B.
Figure 3B:
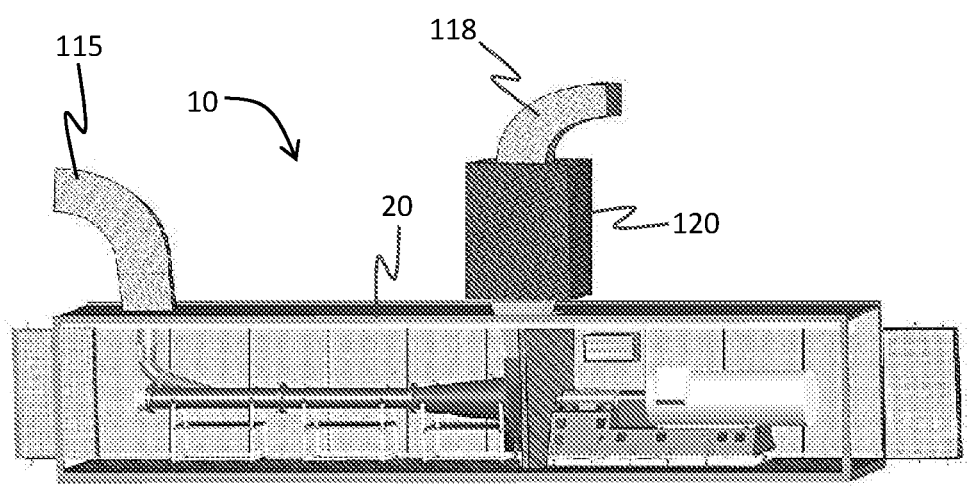

The materials processing plant 10 has a materials input duct 115 that passes through an opening in the roof of the enclosure 20 and couples to the material feed tube 114 of the vortex machine 100. The outlet port 116 also passes through an opening in the roof of the enclosure and is coupled to an output duct 118 through which exhaust air and processed particulate material is expelled for particulate separation, for example by use of one or more cyclonic separators or the like. The input duct 115 and output duct 118 are fitted with noise reducing panels over the outside surfaces thereof. The output duct 118 may additionally or alternatively be fitted with an 'exhaust outlet silencer' 120 as seen in FIGS. 3B and 3C and described further hereinbelow.

There are several materials that can be used as noise reducing panels 42 in the creation of an acoustic enclosure, the most effective of which has been found to be a product known as Noiselock 2, available from IAC Acoustics. These Noiselock panels are 102 mm thick, constructed from a 1.6 mm plain galvanised face sheet and a 1.2 mm plain galvanised back sheet. Infill consists of two layers of 12.5 mm thick gyproc with the remaining void filled with sound absorbing material.

Characteristics of this material include:
A rigid laminate noise barrier and vibration damping material
A unique material construction which results in high sound absorption coupled with resilience and compression loading capability
An extremely robust metal faced insulation with an indefinite life that is unaffected by oil, water, hydrolysis and vibration
Effectively reduces sound radiation and sound transmission in the critical frequency region of rigid panels The panels selected for the noise attenuation layer 40 are extremely dense and very heavy product, making it robust for many industrial applications and the most effective sound absorption product found for use in the construction of individual machine acoustic enclosures to reduce the noise across the range of frequencies encountered when the vortex is operating. Experimental tests of the configuration have shown it possible to obtain an average residual noise level outside the enclosure of 85 dB(A) when measured (free field) at one metre.

For the specific requirements of a vortex acoustic enclosure, the construction of the enclosure may include:
Double layer of noise attenuation panels
Fabricated sound absorption panels attached to the inside of the enclosure as one preformed double thickness sheet
The panels are bolted to a frame which is then bolted to the container wall in sets
Walls, ceiling, doors, exhaust outlet to be covered with sound absorption paneling
Outer layer of enclosure is a 40 ft shipping container to enhance sound absorption.

Figure 4:
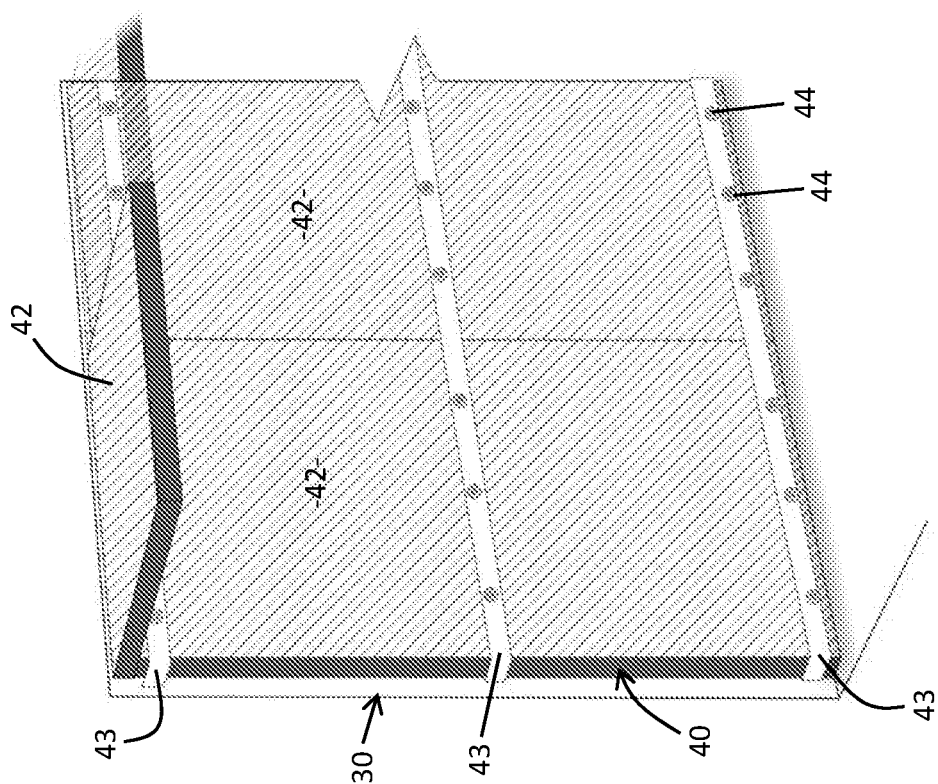

The selected noise reducing panels 42 are quite heavy and should be fastened securely to the enclosure structure for optimum performance. FIG. 4 is a perspective view of a section of the enclosure 20 illustrating one way of mounting the noise attenuation layer 40 to the interior wall of the structure 30 using a series of longitudinal restraints 43. There are shown lower, central and upper restraints 43 extending horizontally across the panels 42 forming the noise attenuation layer 40. The restraints 43 are secured to the structure 30 by use of a series of fasteners 44 that extend through the panels 42.

Figure 5:
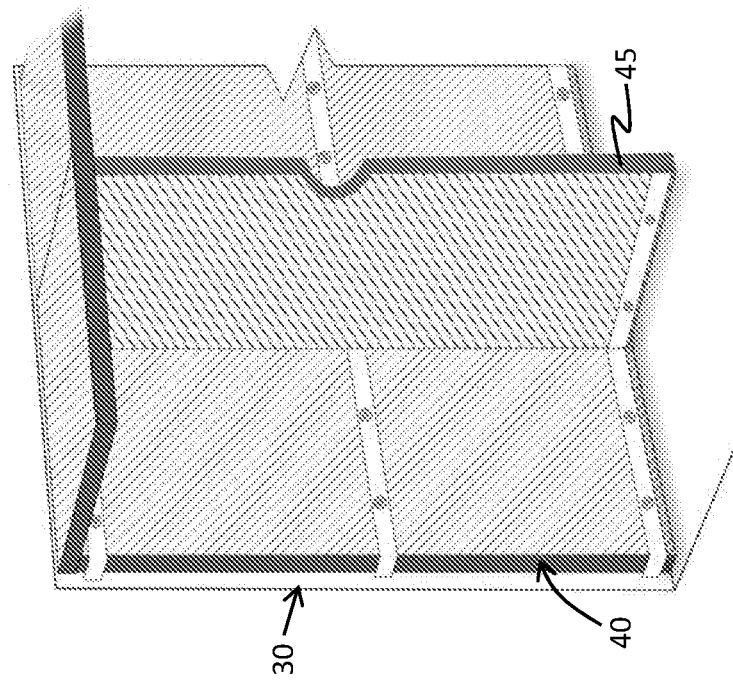
FIGS. 4, 5, 6A and 6B illustrate mounting schemes for noise-attenuation panels in an enclosure according to embodiments of the invention.

The fasteners 44 may comprise bolts, for example, affixed along the walls of the structure 30 with threaded portions projecting into the enclosure space. For ease of construction a series of bolts may be affixed to a length of flat steel that is then subsequently welded to the inner wall surface of the structure 30. Appropriately sized holes are formed in the panels 42 to allow the panels to be fitted against the surface of the structure 30, the fasteners passing through the holes with just the threaded ends exposed for securing the restraints 43 thereon, using washers and nuts, for example. Although a wall section is shown in FIG. 4, a similar system may be used to affix panels 42 over the ceiling, floor and doors of the enclosure of form the complete noise attenuation layer 40. FIG. 5 additionally shows the incorporation of a baffle wall 45.

Figure 6A:
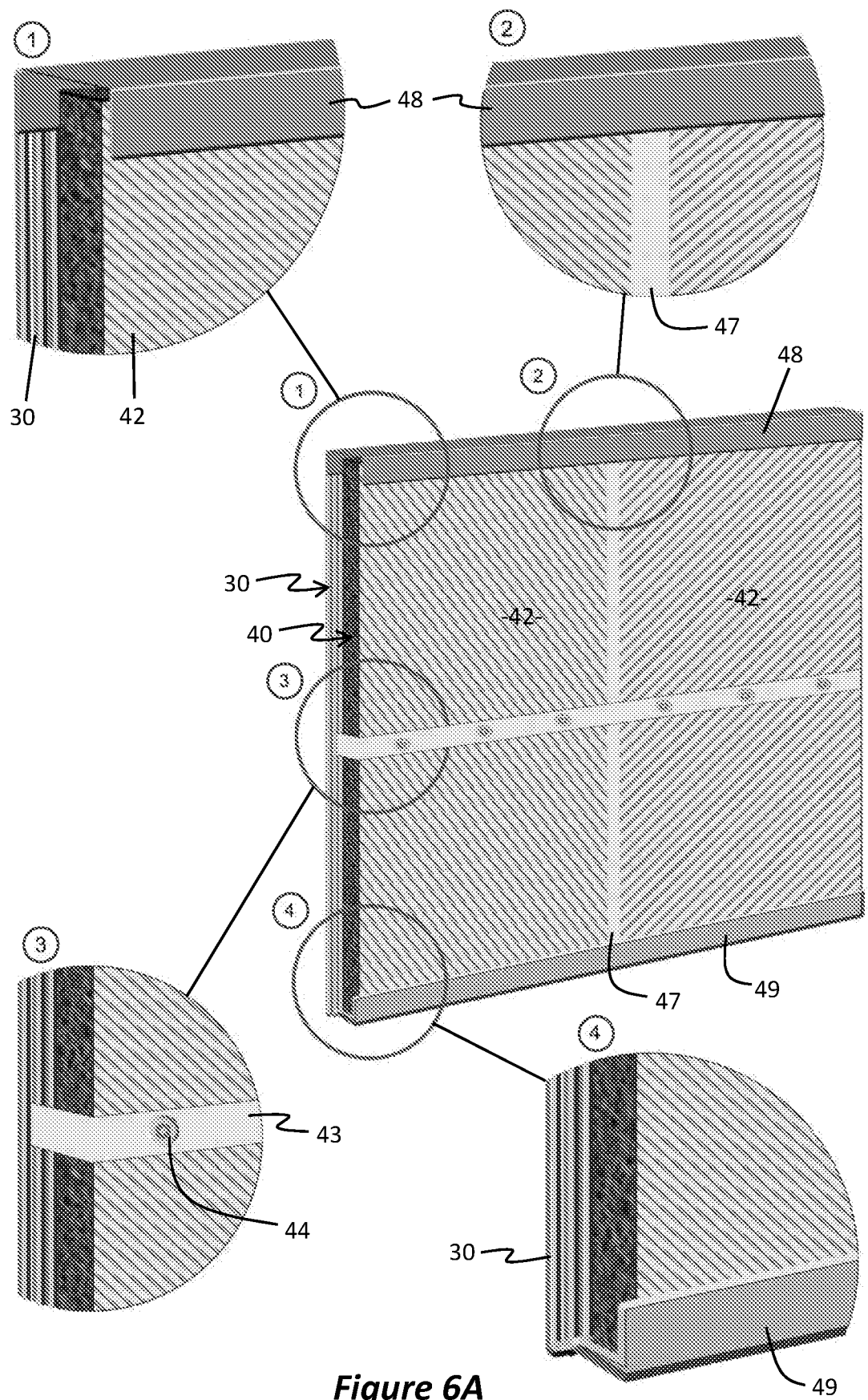
Figure 6B:
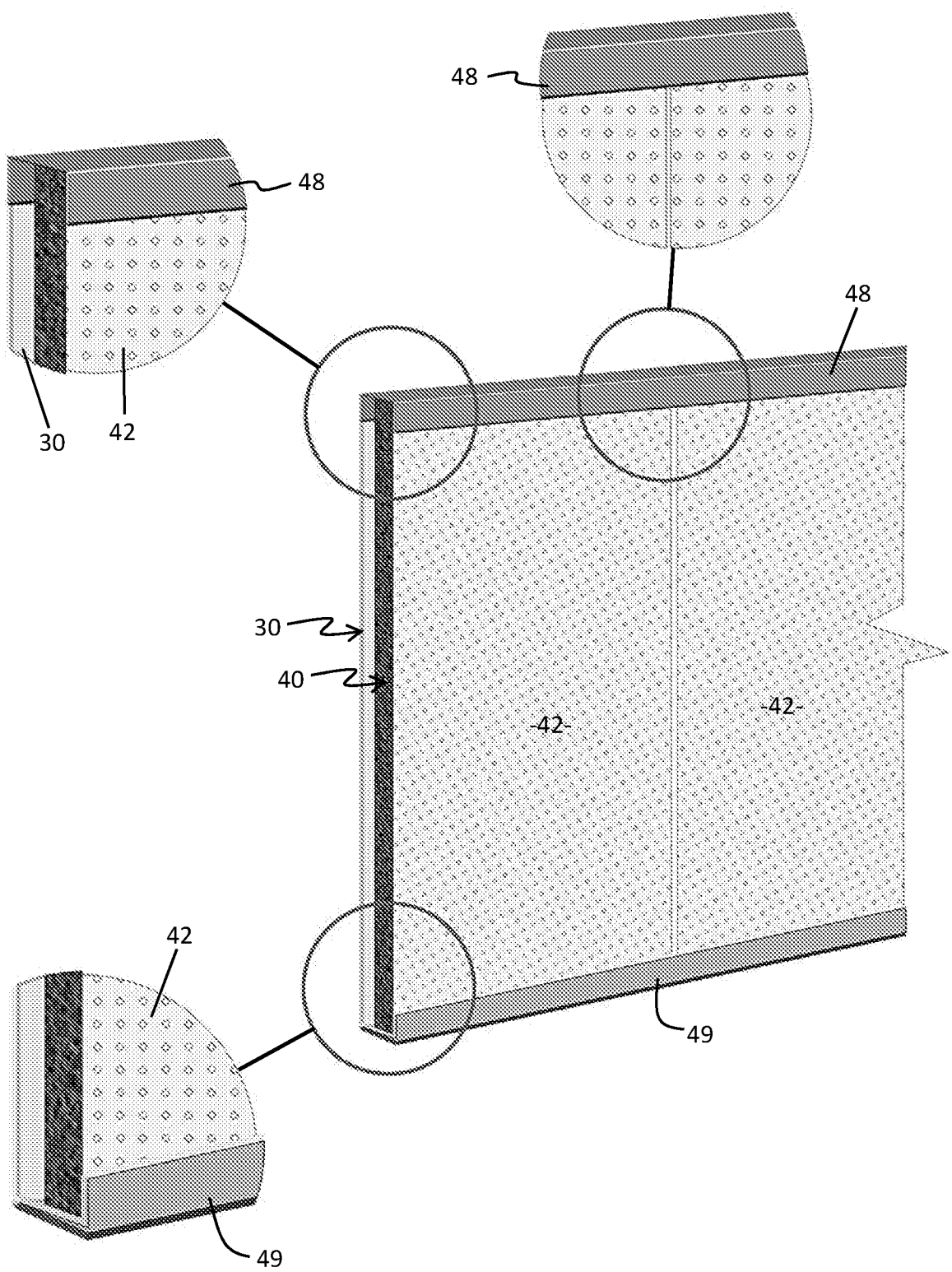

FIG. 6A is an illustration of a wall section from the enclosure 20 (with enlarged views of several portions) showing a variation on the system for attaching the noise attenuation layer 40 to the enclosure structure 30. In this case a restraint strap 43 affixed by fasteners 44 is employed across the center of the panels 42, but channel beams 48, 49 are used to hold the panels in place at the top and bottom, respectively. The channel beams 48, 49 have a channel width to suit the thickness of the noise attenuation layer panels and may be welded, for example, to the structure 30. Also shown in this figure is the use of an adhesive tape material 47 coupling the adjoining edges of panels 42 together to reduce vibrations between the panels. Depending on the particular panel construction used in the enclosure, the restraint straps 43 and fasteners 44 may not be required. For example, panels with sufficient rigidity may be held in place just by the top and bottom channel beams 48, 49 as seen in FIG. 6B.

It has been found that the output duct 118 through which exhaust air and processed particulate material is expelled can emit significant noise, and to combat this effect an exhaust outlet silencer 120 may be fitted as shown in FIGS. 3B and 3C. The exhaust outlet silencer 120 comprises a structure that forms part of the output duct flow path where the output duct exits the top of the enclosure as seen in FIG. 3C. The exhaust outlet silencer 120 has a heavy (4 mm) exterior casing 122 and interior walls lined with the same dense fibre material 124 as the panels described hereinabove. Additionally, two internal vertical baffles 126 are provided, also constructed of the same dense fibre as the panels and covered with perforated galvanized steel. The air flow from the vortex outlet passes in a linear flow through the silencer as indicated by the broken lines and arrows 130 seen in FIG. 3C.

The vortex machine relies on airflow, and thus it is also necessary to allow for airflow into the enclosure, without permitting excessive noise to escape. To ensure the required airflow into the enclosure an air inlet vent has been designed that incorporates a noise flow confusion strategy along with a sound absorption protective layer. This is diagrammatically illustrated in FIG. 7 which shows a partial section through a side wall of the enclosure 20 including an air inflow vent arrangement 31.

The enclosure 20 is designed to house the vortex machine 100 whilst it operates, reducing noise outside the enclosure to workplace acceptable levels. In order to operate the vortex machine 100 must draw in air through its air inlet opening 112. Therefore the enclosure 20 must allow for substantial airflow from the outside to the inside, which air is then expelled through the outlet port 116 and output duct 118. Moreover, the air must be admitted to the enclosure while the doors, for example, remain closed for noise attenuation. For this purpose the structure of the enclosure 20 incorporates at least one air inflow vent arrangement 31 as described hereinbelow.

Figure 7:
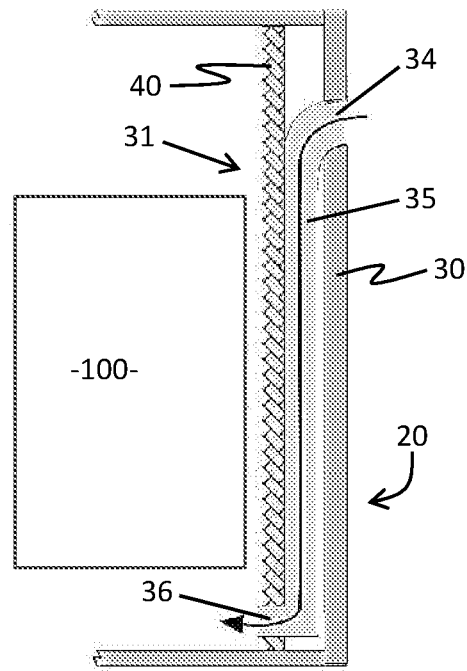
FIG. 7 is a diagrammatic illustration of an air inlet structure for an enclosure according to an embodiment of the invention.

Each air inflow vent arrangement 31 comprises one or more indirect inlet ducts 35 that allow for air to be drawn into the enclosure via an elongate path between the enclosure outer wall 30 and inner noise attenuation layer(s) 40. The inlet duct 35 as shown in FIG. 7 has an external port 34 formed toward the top of the outer wall 30, and in internal port 36 formed toward the bottom of the inner noise attenuation layer 40. The air inflow vent arrangement 31 therefore includes an extended vertical path between the enclosure inner and outer layers, reducing opportunity for noise to escape the enclosure. Interior sound absorption panels are applied so that the duct is encased between the inner sound absorption panels, and the outer casing of the vortex machine.

Figure 8:
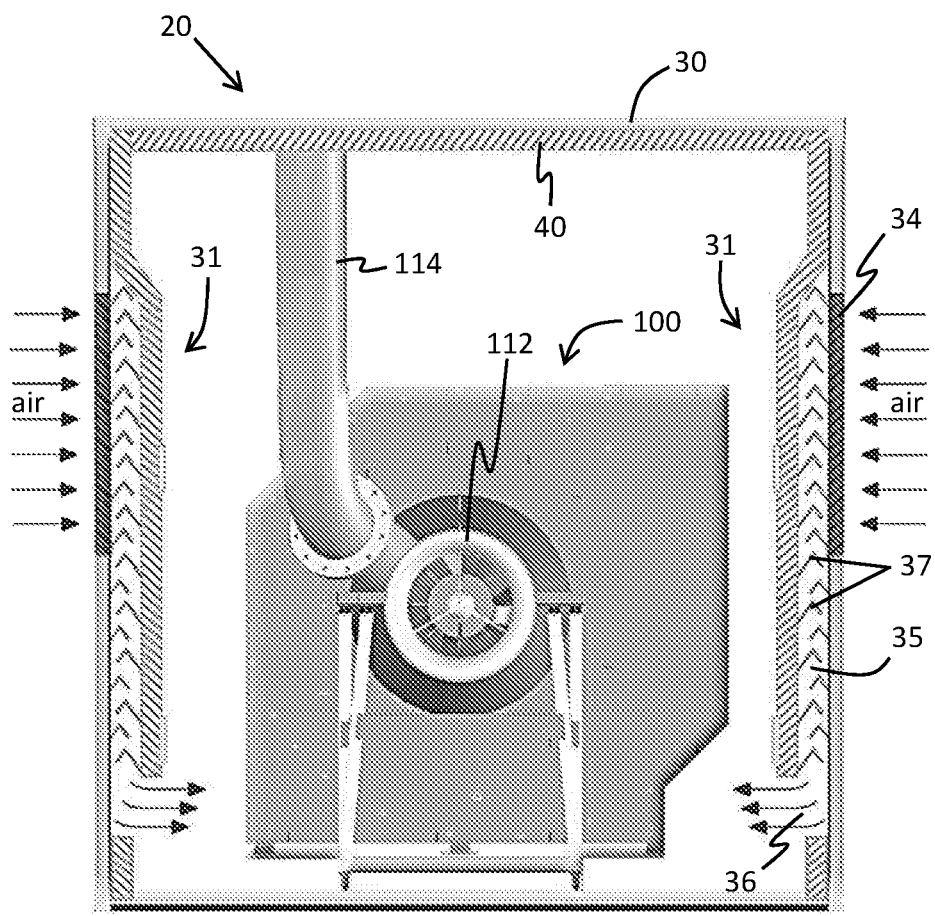
FIG. 8 is a partial-section end view of a vortex machine in a transportable noise-attenuating enclosure according to an embodiment of the invention, particularly illustrating an air inlet structure.
Figure 9:
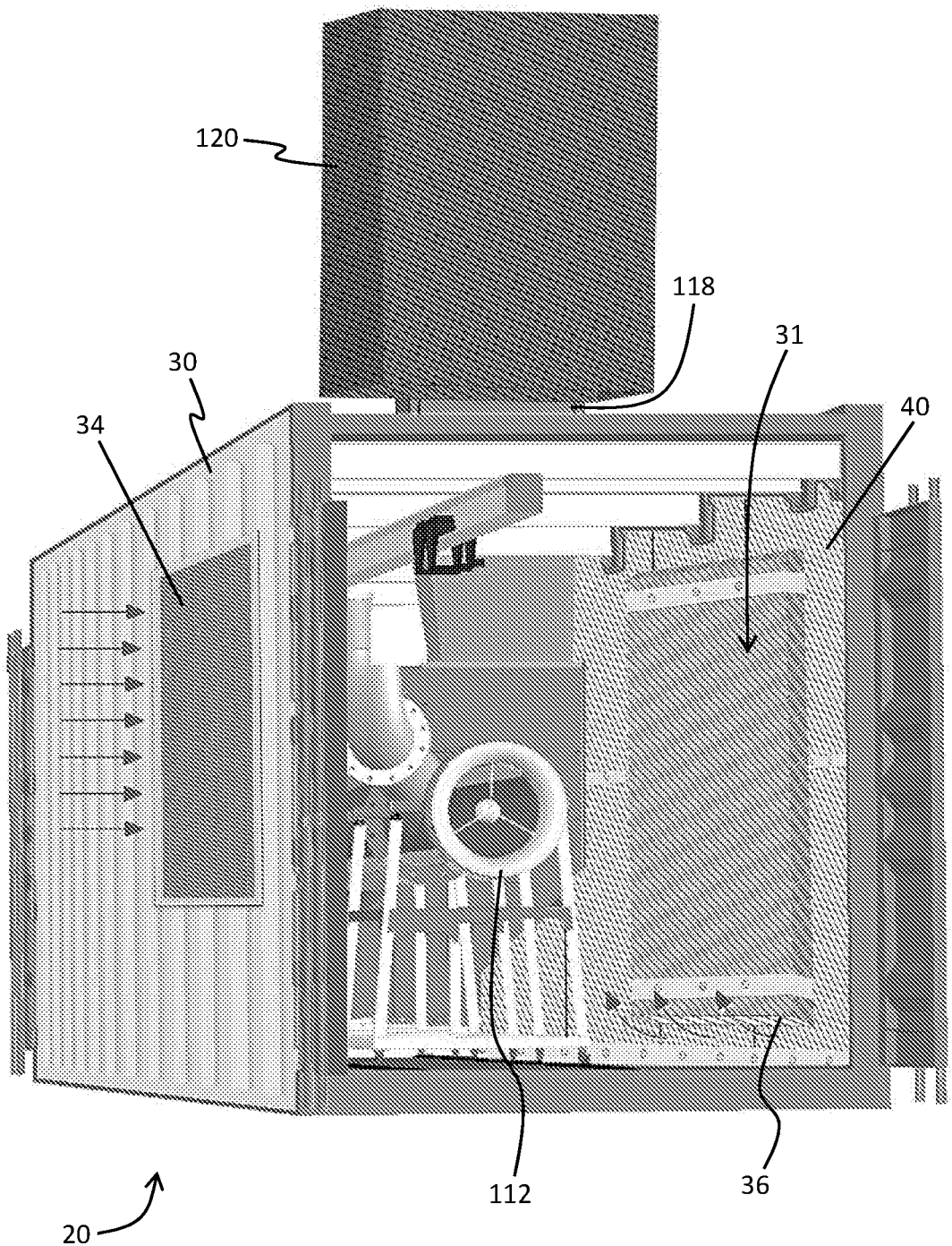
FIG. 9 is a perspective end-view of a vortex machine in an enclosure according to an embodiment of the invention.

Maximum noise reduction is achieved in the duct by creating;
An indirect and confused path for noise escaping the enclosure
Can be further enhanced by adding baffles within the duct
The inside of the duct is covered with sound absorption panels FIGS. 8 and 9 illustrate a variation of the air inflow vent arrangement that incorporates a series of baffles 37 designed to permit airflow while reducing noise escape. As seen in FIG. 8, for example, the baffles 37 may be arranged to allow for airflow through a relatively circuitous path whilst having a structure designed to reflect or reduce the transmission of noise in the opposite direction. The external port 34 in this embodiment is enlarged and includes a vent covering grate inset to the enclosure external wall.

Referring again to FIG. 2, the inclusion of baffle wall 45 in the noise attenuating enclosure 20 has multiple benefits in the operation of the materials processing plant 10. As noted, the baffle wall 45 is partitions the materials processing apparatus from the driving machinery including the motor 102, and includes or is composed of noise attenuating panels 42 of the same kind used on the structure of the enclosure. Although the motor 102, depending on its type, can be quite noisy, in normal operation of the plant 10 it is the materials processing apparatus including the impeller 104 that generates the most noise. Moreover, the materials processing apparatus can also produce dust and fine particulates that escape into the enclosure interior. Thus, the baffle wall 45 may serve a dual purpose of reducing both the incursion of noise and dust to the enclosure space housing the driving machinery (e.g. motor 102). Less dust in and around the motor 102 is self-evidently beneficial and may reduce the frequency of cleaning and maintenance required, whilst lower noise levels may even permit maintenance workers to inspect the motor for short periods of time whilst it is operating.

In order to provide for airflow to and cooling of the motor 102 an air-conditioner unit 25 is installed in the wall of the enclosure 20. The air-conditioner unit 25 is arranged to blow cooled air into the partition space housing the motor 102, creating a relatively positive air pressure therein. The positive air pressure produces net air flow from the motor housing partition into the materials processing apparatus partition, through gaps around the panels and the drive shaft, for example, reducing the likelihood of dust incursion in the opposite direction.

Multiple Vortex Machines in a Single Enclosure

In some applications it may be desirable for multiple vortex units to be housed within a single structure, in which case the enclosure itself can be designed using noise reduction techniques as described hereinabove, including:
a) Enclosure/building inlet ducts designed to confuse the flow of noise, in conjunction with sound attenuation panels.
b) The exhaust duct to be covered with sound attenuation panels
c) The overall enclosure to be covered with sound attenuation panels, preferably on the interior surfaces, potentially utilizing multiple layers of noise attenuations panels that may overlap one another.

The invention has been described by way of non-limiting example only and many modifications and variations may be made thereto without departing from the spirit and scope of the invention.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The claims defining the invention are as follows:

1. An aero-acoustic materials processing plant comprising:
   an aero-acoustic processing machine having a rotational drive apparatus coupled to rotate an air impeller to draw air and material to be processed through an axial inlet system and expel the air and processed material through a transverse outlet; and
   a housing enclosure surrounding the aero-acoustic processing machine, wherein the housing enclosure is constructed to include at least one layer of noise attenuation panels and has a material inlet port, an air inlet port and an exhaust port for outputting processed product with air.

2. A housing for an aero-acoustic processing machine comprising:
   a rotational drive apparatus coupled to rotate an air impeller to draw air and material to be processed through an axial inlet system and expel the air and processed material through a transverse outlet; and
   an enclosure incorporating at least one layer of noise attenuation materials surrounding the aero-acoustic processing machine, the enclosure having a material inlet port, an air inlet port and an exhaust port for outputting processed product with air.

3. The housing according to claim 2, wherein the material inlet port and exhaust port each have respective ducts for conveying raw material and processed product, respectively, into and out of the housing, and wherein the respective ducts are provided with at least one layer of noise attenuation material.

4. The housing according to claim 2, wherein the air inlet port is in communication with an air inflow vent arrangement comprising one or more indirect inlet ducts that allow for air to be drawn into the enclosure via an elongate path between an outer wall of the housing and at least one of said layers of noise attenuation materials.

5. The housing according to claim 4, wherein the air inflow vent arrangement includes a plurality of baffles arranged within each inlet duct for reducing sound emission from the housing through the air inlet port.

6. The housing according to any one of claim 2, wherein the housing includes a baffle wall incorporating or composed of noise attenuation materials, the baffle wall partitioning the housing interior into first and second compartments respectively containing the rotational drive apparatus and the air impeller, wherein a drive shaft is arranged to extend through the baffle wall from the rotational drive apparatus to the air impeller.

7. The housing according to claim 6, wherein the material inlet port, air inlet port and exhaust port are located in the second compartment.

8. The housing according to claim 7, wherein the first compartment is provided with an air-conditioning unit for forced induction of cooled air into the first compartment from outside the housing, creating a relative positive pressure as between the first and second compartments.

9. The housing according to claim 2, wherein the housing includes an output duct arranged to convey processed product entrained in exhaust air to a separation plant such as a cyclonic separator.

10. The housing according to claim 9, wherein the output duct includes an exhaust outlet structure having multiple flow paths between noise reduction panels.

11. The aero-acoustic materials processing plant according to claim 1, wherein the material inlet port and exhaust port each have respective ducts for conveying raw material and processed product, respectively, into and out of the housing enclosure, and wherein the respective ducts are provided with at least one layer of noise attenuation material.

12. The aero-acoustic materials processing plant according to claim 1, wherein the air inlet port is in communication with an air inflow vent arrangement comprising one or more indirect inlet ducts that allow for air to be drawn into the enclosure via an elongate path between an outer wall of the housing enclosure and at least one of said layers of noise attenuation materials.

13. The aero-acoustic materials processing plant according to claim 12, wherein the air inflow vent arrangement includes a plurality of baffles arranged within each inlet duct for reducing sound emission from the housing enclosure through the air inlet port.

14. The aero-acoustic materials processing plant according to claim 1, wherein the housing enclosure includes a baffle wall incorporating or composed of noise attenuation materials, the baffle wall partitioning the housing enclosure interior into first and second compartments respectively containing the rotational drive apparatus and the air impeller, wherein a drive shaft is arranged to extend through the baffle wall from the rotational drive apparatus to the air impeller.

15. The aero-acoustic materials processing plant according to claim 14, wherein the material inlet port, air inlet port and exhaust port are located in the second compartment.

16. The aero-acoustic materials processing plant according to claim 15, wherein the first compartment is provided with an air-conditioning unit for forced induction of cooled air into the first compartment from outside the housing enclosure, creating a relative positive pressure as between the first and second compartments.

17. The aero-acoustic materials processing plant according to claim 1, wherein the housing enclosure includes an output duct arranged to convey processed product entrained in exhaust air to a separation plant such as a cyclonic separator.

18. The aero-acoustic materials processing plant according to claim 17, wherein the output duct includes an exhaust outlet structure having multiple flow paths between noise reduction panels.

* * * * *